(12) United States Patent
Pereira

(10) Patent No.: US 8,684,305 B2
(45) Date of Patent: Apr. 1, 2014

(54) DEVICE AND METHOD FOR CONTROLLING THE POWER SUPPLY OF AT LEAST ONE AIRCRAFT MAINTENANCE ACTUATOR

(75) Inventor: David Pereira, Limours (FR)

(73) Assignee: Aircelle, Gonfreville l'Orcher (FR)

(*) Notice: Subject to any disclaimer, the term of this patent is extended or adjusted under 35 U.S.C. 154(b) by 606 days.

(21) Appl. No.: 12/673,692

(22) PCT Filed: Jun. 2, 2008

(86) PCT No.: PCT/FR2008/000742
§ 371 (c)(1),
(2), (4) Date: Feb. 16, 2010

(87) PCT Pub. No.: WO2009/024656
PCT Pub. Date: Feb. 26, 2009

(65) Prior Publication Data
US 2010/0201190 A1    Aug. 12, 2010

(30) Foreign Application Priority Data
Aug. 20, 2007 (FR) .................... 07 05929

(51) Int. Cl.
*B64C 19/00* (2006.01)
*G05B 11/01* (2006.01)

(52) U.S. Cl.
USPC ......... 244/99.2; 244/99.9; 244/53 R; 318/560

(58) Field of Classification Search
USPC ............ 244/53 R, 99.2, 99.4, 99.9; 318/445, 318/283, 286, 466, 560
See application file for complete search history.

(56) References Cited

U.S. PATENT DOCUMENTS

| | | | | |
|---|---|---|---|---|
| 5,058,873 A * | 10/1991 | Hewitt et al. | ............... | 270/52.13 |
| 5,923,145 A * | 7/1999 | Reichard et al. | ............... | 318/811 |
| 6,227,489 B1 * | 5/2001 | Kitamoto et al. | .......... | 244/118.5 |
| 6,439,504 B1 | 8/2002 | Ahrendt | | |
| 6,622,963 B1 | 9/2003 | Ahrendt | | |
| 6,704,624 B2 * | 3/2004 | Ortega et al. | ..................... | 701/3 |
| 2002/0003579 A1 * | 1/2002 | Inagaki | ........................ | 348/312 |
| 2004/0069082 A1 * | 4/2004 | Koenig et al. | ................... | 74/335 |
| 2011/0250054 A1 * | 10/2011 | Pereira | ......................... | 415/126 |

FOREIGN PATENT DOCUMENTS

| | | | |
|---|---|---|---|
| EP | 0843089 A1 | 5/1998 | |
| WO | 2006134253 A1 | 12/2006 | |

OTHER PUBLICATIONS

International Search Report PCT/FR2008/000742; Nov. 21, 2008.

* cited by examiner

*Primary Examiner* — Philip J Bonzell
*Assistant Examiner* — Marc Burgess
(74) *Attorney, Agent, or Firm* — Brinks Gilson & Lione

(57) ABSTRACT

The invention relates to a method and a device for controlling the power supply of at least one aircraft maintenance actuator (7) from an electrical power supply network (10) of the aircraft comprising means (14) for controlling the electrical power supply of at least one maintenance actuator, and means (15) for establishing communication between the control means and at least one control unit (16) allowing a user to control the operation of at least one actuator. The control means are designed to compare the state of at least one control unit with at least one reference state (SBR) and/or an abnormal state (SBE1, SBE2, SBE3) for switching-on purposes, and to prohibit the activation of the actuator if the state of the control unit is different from a reference state (SBR) or corresponds.

9 Claims, 3 Drawing Sheets

DEVICE AND METHOD FOR CONTROLLING THE POWER SUPPLY OF AT LEAST ONE AIRCRAFT MAINTENANCE ACTUATOR

TECHNICAL FIELD

The invention relates to a method and a device for controlling the power supply of at least one aircraft maintenance actuator, and a turbojet engine nacelle of an aircraft comprising such a device.

BRIEF SUMMARY

An aircraft is moved by a number of turbojet engines, each housed in a nacelle also containing a set of ancillary actuation devices linked to its operation and handling various functions when the turbojet engine is operated or shut down. These ancillary actuation devices notably comprise a mechanical system for actuating thrust reversers.

A nacelle generally has a tubular structure comprising an air inlet at the front of the turbojet engine, a mid-section designed to surround a fan of the turbojet engine, a rear section intended to channel the secondary air stream from the turbojet engine and capable of housing thrust reversal means, and is generally terminated by an exhaust nozzle, the outlet of which is situated downstream of the turbojet engine.

Modern nacelles are often designed to house a dual-stream turbojet engine able to generate, through blades of the rotating fan, a secondary cold air stream which is added to the primary stream of hot gases deriving from the turbine of the turbojet engine.

A nacelle generally has an external structure, called outer fixed structure (OFS), which defines, with a concentric internal structure, called inner fixed structure (IFS), comprising a cowling surrounding the structure of the turbojet engine itself behind the fan, an annular flow channel, also called filament, aiming to channel a so-called secondary cold air stream which circulates outside the turbojet engine. The primary and secondary streams are expelled from the turbojet engine through the rear of the nacelle.

Each propulsion system of the airplane thus comprises a nacelle and a turbojet engine, and is suspended from a fixed structure of the airplane, for example under a wing or on the fuselage, through the intermediary of an engine strut attached to the turbojet engine or to the nacelle.

The nacelle comprises at least one pair of cowlings usually formed by two half-shells of substantially semi-cylindrical form, on either side of a longitudinal vertical plane of symmetry of the nacelle, and mounted to move so as to be able to deploy between a working position and a maintenance position in order to provide access to the turbojet engine.

The two cowlings are generally mounted to pivot about a hinge-forming longitudinal axis in the upper part (at 12 o'clock) of the reverser. The cowlings are held in the closed position by means of locks arranged along a junction line situated in the bottom portion (at 6 o'clock).

The nacelle can include, for example, a pair of fan cowlings, intended to cover the fan portion of the turbojet engine, and a pair of reverser cowlings, comprising a thrust reverser and covering the rear portion of the turbojet engine.

Each cowling is opened using at least one actuator, for example a cylinder, and is held open using at least one connecting rod, the actuator and the connecting rod each having a first end generally fixed to the turbojet engine and a second end fixed to the cowling.

As is known, the actuators can be produced in the form of hydraulic actuators.

It is also known to use electromechanical actuators to displace certain portions of the nacelle, such as the thrust reverser cowlings, as is described in the document EP0843089.

The actuators are controlled by a control unit available to a user, the control unit comprising at least one actuator control button.

The maintenance electrical network which powers the maintenance actuators is powered up generally when the aircraft is deactivated, that is to say when the aircraft is on the ground, when the engine is stopped and no fire is detected on board.

It is possible for one of the control buttons of a control unit to remain depressed, for example because of seizing.

In these conditions, there is a risk of deployment of the actuator in order to open a cowling immediately when the maintenance electrical network is powered up, which can cause premature impairment of the engines and of the electronics of the actuators if the cowling is locked. This deployment can also threaten the safety of personnel by causing an abrupt displacement of the cowling when the latter is unlocked. Furthermore, the deployment of the actuator is performed without having been ordered.

It should be noted that this risk of deployment is generally present for other types of aircraft maintenance actuators, distinct from the nacelle cowling actuators.

BRIEF SUMMARY

The disclosure avoids the deployment of a maintenance actuator without being ordered by the user immediately when the maintenance electrical network is powered up.

To this end, the invention provides a device for controlling the power supply of at least one aircraft maintenance actuator from an electrical power supply network of the aircraft comprising:

means for controlling the electrical power supply of at least one maintenance actuator, means for establishing communication between the control means and at least one control unit allowing a user to control the operation of at least one actuator, characterized in that the control means are designed to compare the state of at least one control unit with at least one reference state and/or an abnormal state for powering up, and to prohibit the activation of the actuator if the state of the control unit is different from a reference state or corresponds to an abnormal state when the power supply network is powered up.

Thanks to the arrangements according to the invention, the operation of the electric actuator is prohibited when the control unit is not in a reference normal state upon power-up.

These arrangements make it possible notably to detect a control unit button having remained depressed, for example because of seizing, and prevent the latter from provoking a displacement of the actuator that is not ordered by the user.

The use of the actuators is thus made safe.

Advantageously, the control means are designed to authorize the activation of the actuator when the state of the control unit is modified to return to a reference state for powering up.

According to one embodiment, the reference state or states correspond to states of the unit in which no movement of the actuator is ordered.

The present invention also relates to a turbojet engine nacelle of an aircraft comprising at least one maintenance actuator, a control unit and a device as described hereinabove.

According to one possibility, the device is arranged in a unit for powering and monitoring the actuators.

According to another possibility, the device is arranged on the actuator.

Another subject of the present invention is a method of controlling the power supply of at least one aircraft maintenance actuator from an electrical power supply network of the aircraft comprising, when the power supply network is powered up, including comparing the state of at least one control unit with at least one reference state and/or an abnormal state for power-up, and in prohibiting the activation of the actuator if the state of the control unit is different from a reference state or corresponds to an abnormal state.

BRIEF DESCRIPTION OF THE DRAWINGS

In any case, the invention will be clearly understood from the following description, with reference to the appended diagrammatic drawing representing, by way of nonlimiting example, one embodiment of this device.

DETAILED DESCRIPTION

Figure 1:
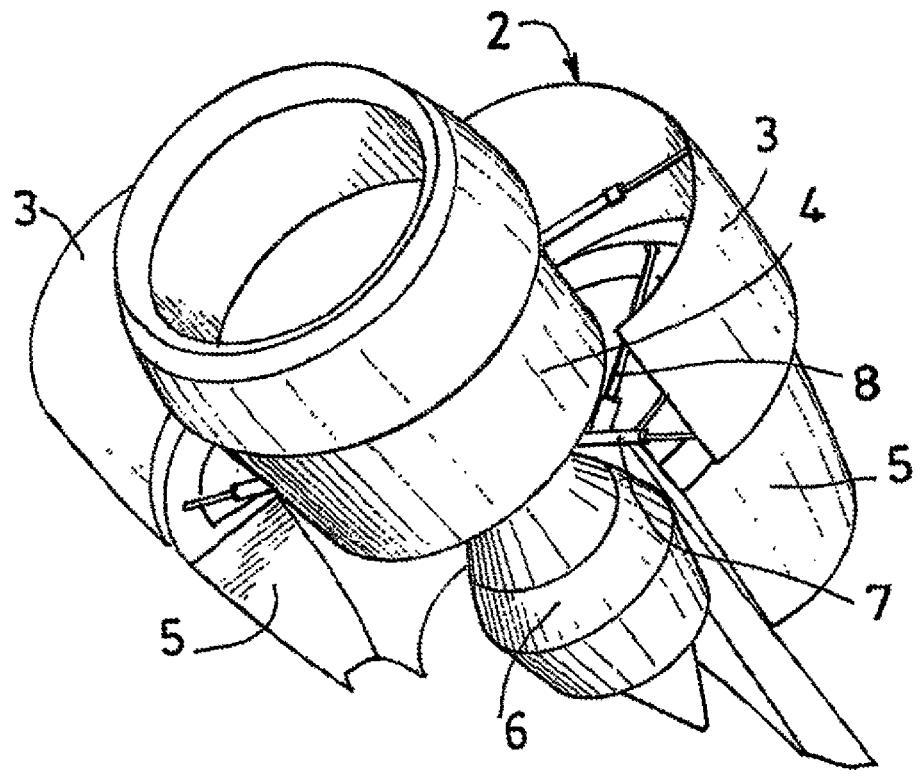
FIG. 1 is a diagrammatic general view in perspective of a nacelle and of a turbojet engine seen from below, the fan and reverser cowlings being open.
Figure 2:
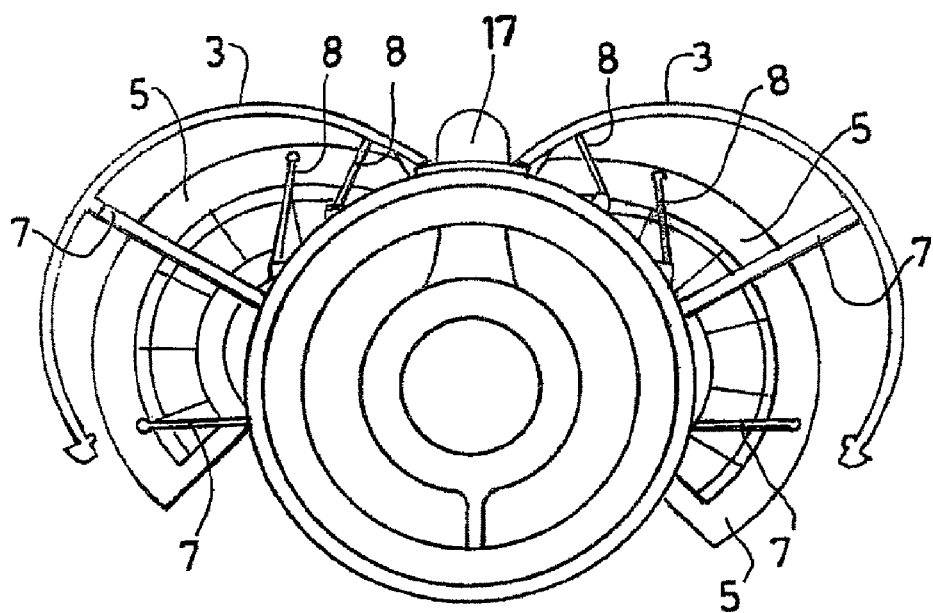
FIG. 2 is a front view of the nacelle and of the turbojet engine of FIG. 1.

As represented in FIGS. 1 and 2, an aircraft nacelle comprises, in a known manner, as described previously, a pair of fan cowlings 3, intended to cover the fan portion of the turbojet engine 4, and a pair of reverser cowlings 5, comprising a thrust reverser and covering the rear portion 6 of the turbojet engine.

The cowlings 3, 4 are driven in movement between their closed and open positions by an actuator comprising, for example, an electromechanical cylinder 7 and held in the open position by a connecting rod 8, as can be seen notably in FIG. 2.

Figure 3:
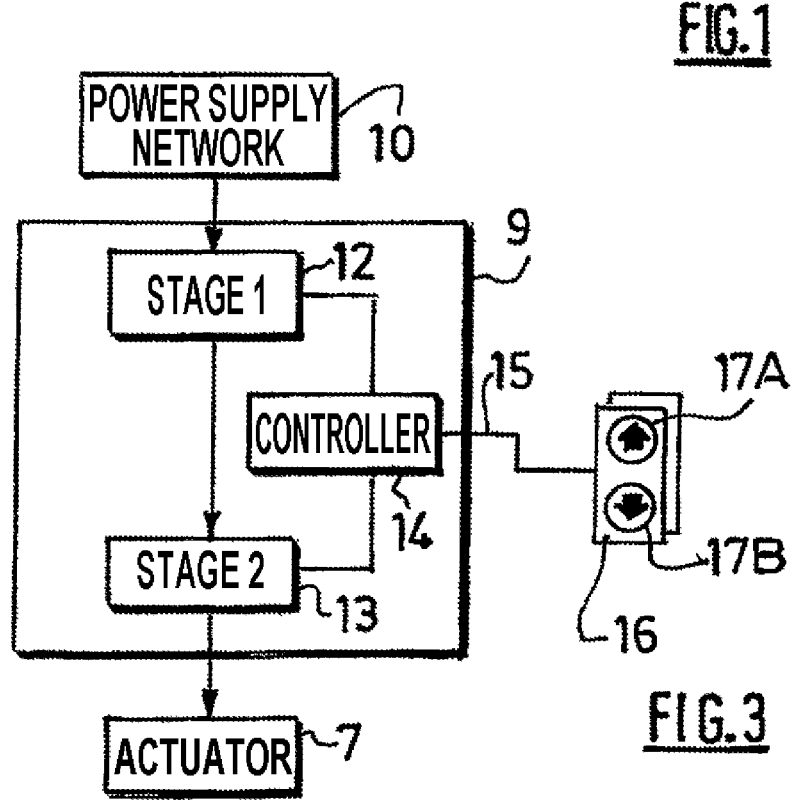
FIG. 3 is a diagrammatic representation of a device according to the invention.

According to the invention, the nacelle comprises a device 9 for controlling the power supply of the maintenance actuators 7 from a maintenance electrical power supply network diagrammatically represented in FIG. 3.

This device is positioned in an actuator power supply and monitoring unit.

The device 9 comprises a first stage 12 to which an electrical power supply network 10 of the aircraft is connected, said network supplying, in the usual manner, a three-phase alternating voltage. This first stage 12 comprises in particular an AC to DC voltage converter, comprising a voltage rectifier and a voltage step-up component, for example to supply a DC voltage of 400 V.

The control device 9 also comprises a power stage 13 designed to power at least one maintenance actuator 7 linked downstream to the device. In particular, the second power stage 13 comprises a converter of a first DC voltage originating from the first stage to a second DC voltage intended to power an actuator 7.

The device further comprises means of controlling the first and second stages 12, 13 composed of a microcontroller 14.

The microcontroller 14 is linked by means 15 for establishing communication 15, for example of wired type, with at least one actuator control unit 16 intended for a user.

The microcontroller 14 is designed to compare the state of at least one control unit 16 with at least one reference state for power-up, and to prohibit the powering up of the actuator if the state of the control unit is different from a reference state when the power supply network is powered up.

FIGS. 4 and 5a to 5c show a control unit 16 in different states.

The unit 16 has two control buttons 17A and 17B respectively corresponding to a command to open a cowling 3, 5 driven by an actuator 7 and to a command to close a cowling 3, 5 driven by the actuator.

These two buttons 17A, 17B close two electrical contacts so as to supply an electrical signal to the microcontroller 14 when they are depressed by electric lines 18 forming the communication means 15.

Figure 4:
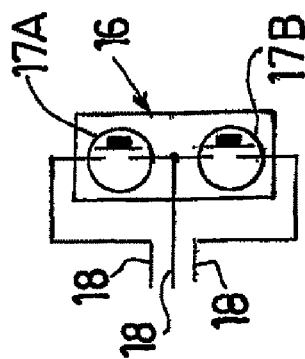
FIG. 4 diagrammatically represents a reference state of a control unit when the power supply network is powered up.

FIG. 4 represents the two buttons 17A, 17B in the rest position. No button is depressed and, consequently, no actuator movement command is sent by the control unit. This arrangement of the unit corresponds to the reference state SBR, for which the powering up of the actuator can be authorized by the microcontroller when the power supply network is powered up.

Figure 5B:
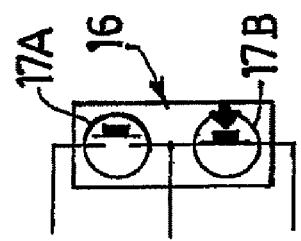
FIGS. 5a to 5c diagrammatically represent abnormal states of the control unit when the power supply network is powered up.
Figure 5C:
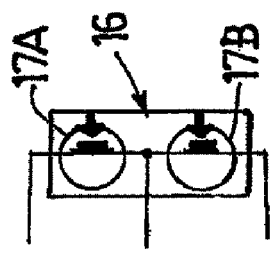
Figure 5A:
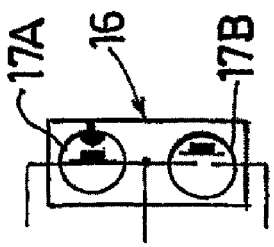

FIGS. 5a to 5c represent three states SBE1, SBE2, SBE3 of the control unit that do not correspond to reference states, but to abnormal states. In particular, in the state SBE1 corresponding to FIG. 5a, the cowling open button 17A is depressed, which corresponds to the sending of a command to move the actuator 7 in a direction causing the cowling to open, the close button 17B being in its rest position.

In the state SBE2 corresponding to FIG. 5b, the cowling close button 17B is depressed, which corresponds to the sending of a command to move the actuator in a direction provoking the closure of the cowling, the open button 17A being in its rest position.

In the state SBE3 corresponding to FIG. 5c, the cowling close and open buttons 17A and 17B are depressed, which does not correspond to a consistent actuator command.

Figure 6:
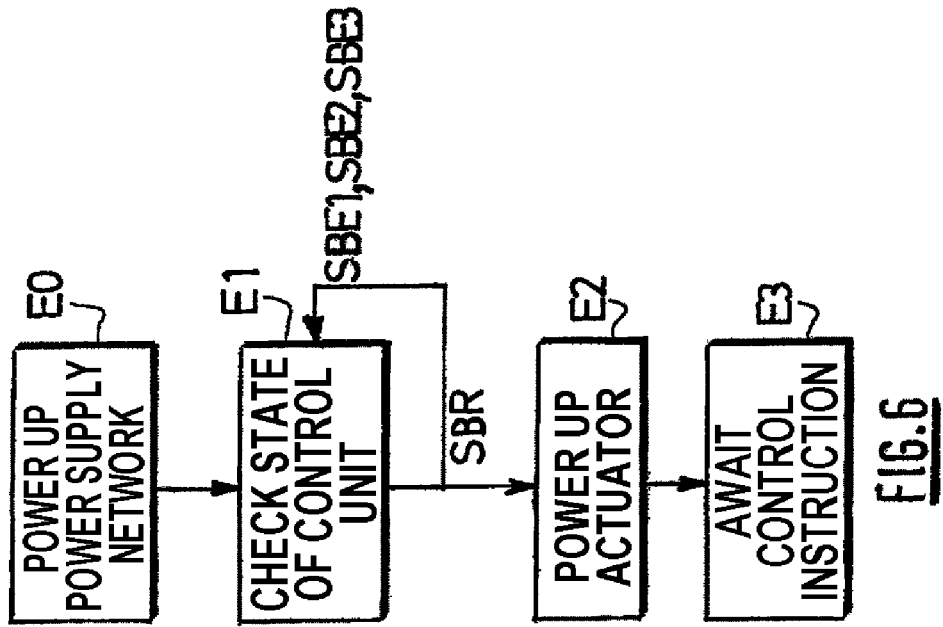
FIG. 6 is a flow chart of a method of controlling the power supply of an aircraft maintenance actuator.

Thus, as represented in FIG. 6, following the powering up of the power supply network E0, a method of controlling the power supply implemented by the device comprises a first step E1 consisting in comparing the state of at least one control unit 16 with at least one reference state SBR for power-up.

If the state of the control unit corresponds to the reference state SBR, the microcontroller 14 powers up the actuator in a second step E2 of the method, then awaits a control instruction originating from the control unit 16 in a third step E3.

In the opposite case, that is to say, if the control unit 16 is in one of the states SBE1, SBE2, SBE3 described hereinabove with reference to FIGS. 4a to 4c, the powering up of the actuator is not authorized because the state of the control unit is different from a reference state.

The step E1 of the method is repeated until the state of the control unit is modified to return to a reference state SBR for power-up.

According to a variant, the device is arranged directly on the actuator.

According to another variant, the same control device makes it possible to monitor the powering up of a number of actuators by checking the state on power-up of a number of control units.

It goes without saying that the invention is not limited to the single implementation of the device described hereinabove by way of example, but, on the contrary, encompasses all the variants.

It should be noted in particular that other types of cowling could be controlled by the actuators powered by the device.

The invention claimed is:

1. A device for controlling power supply of at least one aircraft maintenance actuator from an electrical power supply network of the aircraft, comprising:
    control means for controlling the electrical power supply of at least one maintenance actuator and
    means for establishing communication between the control means and at least one control unit allowing a user to control the operation of the at least one maintenance actuator,
    wherein the at least one control unit comprises a first control button which when it is depressed, corresponds to the sending of a command to move the maintenance actuator in a direction causing the opening of a cowling, and a second button which when it is depressed, corresponds to the sending of a command to move the maintenance actuator in a direction causing the closing of the cowling, the control means being arranged to compare states of the first and second control buttons, with:
    a reference state in which the first control button and the second control button are in its rest position and for which powering up of the actuator can be authorized by the control means when the power supply network is powered up,
    a first abnormal state in which the first control button is depressed and the second control button is in its rest position, for which the powering up of the actuator is blocked when the power supply network is powered up,
    a second abnormal state in which the first control button is in its rest position and the second control button is depressed, for which the powering up of the actuator is blocked when the power supply network is powered up, and
    a third abnormal state in which the first control button is depressed and the second control button is depressed, for which the powering up of the actuator is blocked when the power supply network is powered up.

2. The device as claimed in claim 1, wherein the control means are designed to authorize activation of the actuator when the state of the control unit is modified to return to the reference state for powering up.

3. The device as claimed in claim 1, wherein the reference state or states correspond to states of the control unit in which no movement of the actuator is ordered.

4. A turbojet engine nacelle of an aircraft comprising at least one maintenance actuator, a control unit and a device as claimed in claim 1.

5. The nacelle as claimed in claim 4, wherein the device is arranged in a unit for powering and monitoring the actuators.

6. The nacelle as claimed in claim 4, wherein the device is arranged on the actuator.

7. A method of controlling a power supply of at least one aircraft maintenance actuator from an electrical power supply network of the aircraft comprising,
    a step of receiving an electrical signal from a control unit comprising a first button and a second button;
    a step of deciding whether a state of the control unit is a reference state or abnormal states by comparing states of the first and second buttons of the control unit with;
    a reference state, in which the first control button and the second control button are in its rest position,
    a first abnormal state in which the first control button is depressed and the second control button is in its rest position,
    a second abnormal state in which the first control button is in its rest position and the second control button is depressed,
    a third abnormal state in which the first control button is depressed and the second control button is depressed; and
    a step of powering up of the at least one maintenance actuator according to an authorization of a control means if the control unit is in the reference state.

8. The method as claimed in claim 7, wherein the activation of the actuator is authorized when the state of the control unit is modified to return to the reference state for power-up.

9. The method as claimed in claim 7, wherein the reference state or states correspond to states of the unit in which no movement of the actuator is ordered.

* * * * *